(12) United States Patent
Reales Bertomeo (10) Patent No.: US 10,738,430 B2
(45) Date of Patent: Aug. 11, 2020

(54) OFFSHORE FOUNDATION STRUCTURE WITH GANGWAY AND IMPROVED BOAT LANDING

(71) Applicant: MARITIME OFFSHORE GROUP GMBH, Bremen (DE)

(72) Inventor: Emilio Reales Bertomeo, Delmenhorst (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 15/549,134

(22) PCT Filed: Oct. 19, 2015

(86) PCT No.: PCT/EP2015/074100
§ 371 (c)(1),
(2) Date: Dec. 11, 2017

(87) PCT Pub. No.: WO2016/124263
PCT Pub. Date: Aug. 11, 2016

(65) Prior Publication Data
US 2018/0135267 A1    May 17, 2018

(30) Foreign Application Priority Data

Feb. 6, 2015   (DE) .................... 20 2015 000 876 U
Jun. 25, 2015  (DE) .................... 20 2015 103 351 U (51) Int. Cl.
*E02B 3/06*     (2006.01)
*E02B 17/02*    (2006.01)
(Continued)

(52) U.S. Cl.
CPC ............... *E02B 17/00* (2013.01); *B66B 9/00* (2013.01); *E02B 17/0004* (2013.01);
(Continued)

(58) Field of Classification Search
CPC ........ E02B 3/064; E02B 3/068; E02B 17/021; E02B 17/00; E02B 17/0017;
(Continued)

(56) References Cited

U.S. PATENT DOCUMENTS 2,422,168 A  *  6/1947  Kirby .................. E02B 17/0004
                                                    405/205
3,107,495 A  *  10/1963 Plodowski .............. E02B 17/00
                                                    405/225
(Continued)

FOREIGN PATENT DOCUMENTS

DE        10315135 A1    10/2004
DE   102006056274 A1 *    5/2008  ............. E04H 12/08
(Continued)

OTHER PUBLICATIONS

Examination Report issued in European Application No. 15 787 504.8, dated Oct. 24, 2018.

*Primary Examiner* — Benjamin F Fiorello
*Assistant Examiner* — Edwin J Toldeo-Duran
(74) *Attorney, Agent, or Firm* — BakerHostetler LLP (57) ABSTRACT

An offshore foundation structure includes a jacket portion having a plurality of struts interconnected in a framework-like manner, and a receiving means for a tower shaft of a wind power installation. The platform is arranged at least partially in the interior of the jacket portion. The offshore foundation structure also has a gangway and a lift.

30 Claims, 5 Drawing Sheets

(51) Int. Cl.
  *E02B 17/00* (2006.01)
  *E02D 27/52* (2006.01)
  *B66B 9/00* (2006.01)
  *E02D 27/42* (2006.01)
  *E06C 9/02* (2006.01)

(52) U.S. Cl.
  CPC ...... *E02B 17/0017* (2013.01); *E02B 17/0034* (2013.01); *E02B 17/027* (2013.01); *E02D 27/425* (2013.01); *E02D 27/52* (2013.01); *E06C 9/02* (2013.01); *E02B 2017/0091* (2013.01)

(58) Field of Classification Search
  CPC ............... E02B 17/0004; E02B 17/027; E02B 17/0034; E02B 2017/0091; E06C 9/02; E02D 27/425; E02D 27/52; B66B 9/00
  USPC .............................................. 405/195.1–224
  See application file for complete search history.

(56) References Cited

U.S. PATENT DOCUMENTS

| | | | | |
|---|---|---|---|---|
| 3,145,539 A | * | 8/1964 | Estes | E02B 17/027 405/210 |
| 3,204,721 A | * | 9/1965 | Park | E04H 12/00 182/115 |
| 3,463,271 A | * | 8/1969 | St. Louis | E04G 3/32 187/259 |
| 3,512,811 A | * | 5/1970 | Bardgette et al. | E02B 17/0008 285/288.1 |
| 3,812,771 A | * | 5/1974 | Yokoyama | E04H 12/28 454/1 |
| 4,295,317 A | * | 10/1981 | VanTielen | E04H 12/10 52/637 |
| 4,403,916 A | * | 9/1983 | Skelskey | F03D 7/0212 416/14 |
| 4,640,647 A | * | 2/1987 | Blair | E02B 17/00 166/368 |
| 4,645,379 A | * | 2/1987 | Grimsley | B63B 35/44 220/652 |
| 4,710,061 A | * | 12/1987 | Blair | E02B 17/00 166/368 |
| 4,739,840 A | * | 4/1988 | Cox | E02B 17/00 175/9 |
| 4,812,080 A | * | 3/1989 | Urquhart | E02B 17/027 405/204 |
| 4,824,291 A | * | 4/1989 | Coppens | E02B 17/00 405/204 |
| 5,356,239 A | * | 10/1994 | Canton | E02B 17/027 405/204 |
| 5,669,735 A | * | 9/1997 | Blandford | E02B 17/027 405/195.1 |
| 6,299,385 B1 | * | 10/2001 | Barnes | E02B 17/021 405/195.1 |
| 7,198,453 B2 | * | 4/2007 | Hall | E02B 17/027 415/4.3 |
| 7,735,290 B2 | * | 6/2010 | Arsene | F03D 13/20 52/651.01 |
| 7,993,107 B2 | * | 8/2011 | Gevers | F03D 13/10 416/244 R |
| 8,511,940 B2 | * | 8/2013 | Hall | E02D 27/52 405/195.1 |
| 8,578,681 B2 | * | 11/2013 | Patterson | E02B 17/027 52/848 |
| 9,617,752 B2 | * | 4/2017 | Wagner | F03D 13/20 |
| 9,765,547 B2 | * | 9/2017 | Larsen | B21C 37/296 |
| 10,302,070 B2 | * | 5/2019 | Donescu | E02B 17/0004 |
| 2002/0190168 A1 | * | 12/2002 | Hall | E02B 17/027 248/188.7 |
| 2005/0134050 A1 | * | 6/2005 | Salls, Jr. | F03D 13/25 290/54 |
| 2006/0104821 A1 | * | 5/2006 | Hall | E02D 27/425 416/244 R |
| 2006/0115364 A1 | * | 6/2006 | Hall | F03D 13/10 416/244 R |
| 2006/0237600 A1 | * | 10/2006 | Hall | E02B 17/027 248/188.7 |
| 2006/0267348 A1 | * | 11/2006 | Weitkamp | F03D 13/20 290/55 |
| 2007/0243063 A1 | * | 10/2007 | Schellstede | F03D 13/22 416/10 |
| 2007/0296220 A1 | * | 12/2007 | Kristensen | B66B 9/187 290/55 |
| 2009/0223139 A1 | * | 9/2009 | Meiners | F03D 80/80 52/40 |
| 2009/0307998 A1 | * | 12/2009 | Zavitz | F03D 13/22 52/152 |
| 2010/0077693 A1 | * | 4/2010 | Cheynet de Beaupre | B64G 9/00 52/645 |
| 2010/0135792 A1 | * | 6/2010 | Niehues | F03D 13/20 416/1 |
| 2010/0155176 A1 | * | 6/2010 | Lohr | E06C 7/16 182/113 |
| 2010/0293781 A1 | * | 11/2010 | Foo | B66C 23/52 29/791 |
| 2011/0037264 A1 | * | 2/2011 | Roddier | F03D 9/25 290/44 |
| 2012/0137622 A1 | * | 6/2012 | Patterson | F03D 13/22 52/651.01 |
| 2012/0263544 A1 | * | 10/2012 | Oestergaard | E02B 17/00 405/224 |
| 2012/0263545 A1 | * | 10/2012 | Oestergaard | E04H 12/34 405/227 |
| 2013/0078109 A1 | * | 3/2013 | Schellstede | F03D 13/10 416/244 R |
| 2013/0266453 A1 | * | 10/2013 | Moiret | E02D 27/42 416/244 R |
| 2013/0283722 A1 | * | 10/2013 | Kyatham | E02B 17/027 52/651.07 |
| 2014/0075864 A1 | * | 3/2014 | Foss | F03D 13/22 52/223.4 |
| 2014/0115987 A1 | * | 5/2014 | Rodriguez Tsouroukdissian | E02D 27/42 52/298 |
| 2014/0147272 A1 | * | 5/2014 | Donescu | F03D 80/50 416/1 |
| 2014/0328632 A1 | * | 11/2014 | Lefranc | E02B 17/0008 405/225 |
| 2015/0158704 A1 | * | 6/2015 | Giles | B66C 23/185 212/273 |
| 2015/0198148 A1 | * | 7/2015 | Mello | F03D 13/25 416/244 R |
| 2015/0218840 A1 | * | 8/2015 | Paton | E02B 17/0004 52/651.01 |
| 2015/0292175 A1 | * | 10/2015 | Kramer | F03D 13/25 405/211.1 |
| 2016/0258421 A1 | * | 9/2016 | Agassi | F03D 13/35 |
| 2016/0272284 A1 | * | 9/2016 | Grossmann | B63B 21/502 |
| 2018/0266396 A1 | * | 9/2018 | Drewes | E04H 12/08 |
| 2018/0313106 A1 | * | 11/2018 | Chase | E06C 9/02 |

FOREIGN PATENT DOCUMENTS

| | | | |
|---|---|---|---|
| DE | 20 2011 101599 U1 | 9/2011 | |
| DE | 202011101599 U1 | * 9/2011 | ......... E02B 17/0004 |
| DE | 10 2010 035025 A1 | 2/2012 | |
| DE | 20 2012 005538 U1 | 9/2013 | |
| EP | 2290237 A2 | * 3/2011 | .......... E02B 17/027 |
| EP | 2647764 A1 | * 10/2013 | ......... E02B 17/0004 |
| EP | 2 690 221 A1 | 1/2014 | |
| WO | 2012167015 A2 | 12/2012 | |
| WO | 2013/139816 A2 | 9/2013 | |

* cited by examiner

OFFSHORE FOUNDATION STRUCTURE WITH GANGWAY AND IMPROVED BOAT LANDING

CROSS-REFERENCE TO RELATED APPLICATIONS

This application is a National Stage of International patent application PCT/EP2015/074100, filed Oct. 19, 2015, which claims priority to German patent application Nos. DE 202015000876.3, filed Feb. 6, 2015, and DE 202015103351.6, filed Jun. 25, 2015, the disclosures of which are incorporated by reference in their entirety.

FIELD OF THE INVENTION

The invention concerns an offshore foundation structure comprising a jacket portion which has a plurality of struts interconnected in a framework-like manner, and a receiving means for a tower shaft, in particular for a tower shaft of a wind power installation.

BACKGROUND

Such foundation structures which are based on a jacket construction are used in particular in the installation of wind power installations in offshore regions involving a great depth of water. The jacket construction has increased water permeability in comparison with usual monopile constructions, so that the loadings on the offshore foundation structure, that are caused by the flow of water, are reduced.

It has further already been shown that the installation of jacket-based offshore foundation structures can be implemented in such a way as to produce substantially lower levels of emissions. Jacket constructions permit anchorage to the bed of the body of water with a plurality of driven piles. Driving in a plurality of small driven piles into the bed of the body of water can be carried out with a substantially lower level of emissions than driving in large monopile anchorings.

Because wind power installations are continuously increasing in size the demands made on the offshore foundation structures in regard to their load-bearing capability are also increasing.

Furthermore considerable dynamic forces are also applied by the tower of the wind power installation to the offshore foundation structure which has to support them in relation to the bed of the body of water. In order to be able to use wind power installations in offshore areas involving high wind strengths there is also regularly a need for foundation structures with an enhanced load-bearing capability.

An offshore foundation structure of that kind is known for example from DE 20 2011 101 599 U1 to the present inventor. When such an offshore foundation structure is anchored in the sea bed and a wind power installation is fixed thereto it may be necessary to maintain same. For maintenance of the wind power installation fitters are taken by means of a boat to a landing structure, a so-called boat landing, and from there the fitters have to climb upwardly to up to 22 metres by way of a substantially vertically extending ladder in order to get on to the platform, the so-called working platform, which extends at the interface, the so-called transition piece. A small recovery platform is usually provided at about halfway up the ladder so that the fitters do not have to climb the entire distance in one go but can take a rest at an intermediate point. Nonetheless the climbing operation is greatly exhausting and particularly in the case of older or unaccustomed workers leads to serious physical problems. In addition climbing over the open sea is very dangerous, also because the fitter is constantly exposed to wind and water while climbing the ladder.

It has therefore already been proposed that the ladder be replaced by an elevator which goes directly from the boat landing to the working platform. Admittedly it is possible in that way to avoid the physical exertions which occur when climbing up the 22 metre-long ladder, but an elevator is costly and susceptible to trouble. In addition it is usually necessary in the case of such offshore support structures to provide more than one ladder or elevator so that, depending on the weather conditions, the support structure can be approached with the boat from different sides.

SUMMARY OF THE INVENTION

Consequently an object of the present invention is to provide an arrangement, in particular an offshore support structure, in which getting fitter personnel from a boat on to the working platform is simplified and safer.

That object is attained by an offshore foundation structure having the features of the independent claims, and by a platform, a gangway and a lift having the features of the independent claims. Advantageous developments are subject-matter of the appendant claims.

Accordingly the object is attained by an offshore foundation structure having a jacket portion which has a plurality of struts interconnected in a framework-like manner, a receiving means for a tower shaft, in particular for a tower shaft of a wind power installation, and a platform which is arranged at least partially in the interior of the jacket portion. The platform is preferably arranged below the receiving means. The platform is preferably arranged below the receiving means by about 5 to 20 metres, preferably 10 to 15 metres. In addition there is preferably provided a docking arrangement or landing means or landing structure or boat landing. The docking structure preferably extends outside the jacket structure along same and has a ladder or the like. The ladder of the landing structure or the docking arrangement preferably extends approximately from the height of the platform further downwardly, preferably 5 to 15 metres. In that way a boat can dock at the lower end of the ladder and a fitter can climb on to the platform by way of the ladder. As a result the total climbing length is substantially reduced and a fitter can take a rest on the platform. In that case he is always in the interior of the jacket structure and therefore at least partially protected from waves and wind. It is preferable for the docking structure to have a ladder and not a lift. If it has a lift, it is admittedly easier to climb to the platform, but there is the risk that the lift may be damaged when docking the boat. Therefore lifts which are provided directly at the docking arrangement are less preferred by fitters as here there is always the danger of being damaged with swell and thus entailing liability cases.

Preferably or alternatively there is provided a gangway which preferably extends in the interior of the jacket portion. A jacket portion is preferably of a cylindrical or frustoconical basic shape, wherein the external contour is preferably quadrangular, pentagonal, hexagonal, heptagonal or octagonal. The jacket portion preferably comprises a plurality of struts which extend in a partly ring-shaped or polygonal configuration around a central axis and form rings. The remaining struts connect such rings or polygons together, for example by means of x nodes or other nodes.

The gangway preferably extends radially with respect to a jacket portion from the outside inwardly so that a fitter can pass inwardly in a protected condition from outside the jacket portion. The gangway is preferably in the form of a jetty with railings, a passage, a tunnel, an enclosed passage, a suspension bridge or the like. The gangway is preferably provided in addition to or alternatively to the platform. In a variant the platform is small and is of a substantially rectangular basic structure, and is disposed approximately centrally within the jacket portion. The gangway connects the platform to the outside of the jacket portion. In that case the gangway is so arranged that a fitter can readily pass from the ladder of the docking arrangement directly into the gangway. Consequently the gangway connects the platform to the ladder. Alternatively the gangway is provided on the platform and the platform extends substantially completely through the inside cross-section of the jacket portion. Preferably an offshore foundation structure is provided with a jacket portion having a plurality of struts interconnected in a framework-like manner, a receiving means for a tower shaft portion, in particular for a tower shaft of a wind power installation, and which has a lift. The lift is preferably arranged beneath the tower shaft in such a way that a fitter can go from a platform arranged beneath the tower shaft into the interior of the tower shaft by means of the lift. Alternatively the lift is so arranged that a fitter can go from a platform arranged beneath the tower shaft directly on to a service platform which extends around the tower shaft in the lower region. When going directly into the interior of the tower, that has the advantage that the fitter is protected from wind and weather when climbing out of the lift. That substantially improves the safety aspect when working. To ensure that it is possible to reach the platform and the tower shaft a ladder extending to the tower shaft is preferably provided beside the lift. The corresponding entry opening in a bottom of the tower shaft and/or a corresponding receiving means for a tower shaft is preferably closable by a hatch which can be opened inwardly. In the event of failure of the lift therefore there is an alternative possible way of entering or leaving the tower shaft. In particular advantages are achieved by the combination of the above-mentioned features, namely a platform in the interior of the jacket portion, the docking arrangement, as well as the lift and the gangway. A fitter can dock at the docking arrangement with his boat, climb up the shortened ladder to the platform, then pass into the gangway, go to the lift by means of the gangway and then travel with the lift from the platform into the interior of the tower shaft where then there are preferably provided further platforms or a room.

The offshore foundation structure and in particular the jacket portion is preferably designed like the offshore support structure and the framework structure in accordance with German Utility Model DE 20 2011 101 599, the content of that Utility Model being incorporated by reference thereto.

Alternatively or additionally the offshore foundation structure or the jacket portion is designed as in the European patent application bearing the filing number 13 177 869, application filing date of 24 Jul. 2013, the content of that application being incorporated by reference thereto. Preferably the struts of the jacket portion have a coating, as described in German Utility Model DE 20 2012 005 538, the content of which is incorporated here by reference thereto. It is further preferred for the foundation structure or the jacket portion to be designed as described in International publication WO 2013/139816 A2, the content of that publication also being incorporated herein by reference thereto.

BRIEF DESCRIPTION OF THE DRAWINGS

Further features and advantages of the invention will be apparent from the description hereinafter of preferred embodiments with reference to the drawings in which.

DETAILED DESCRIPTION

Figure 1:
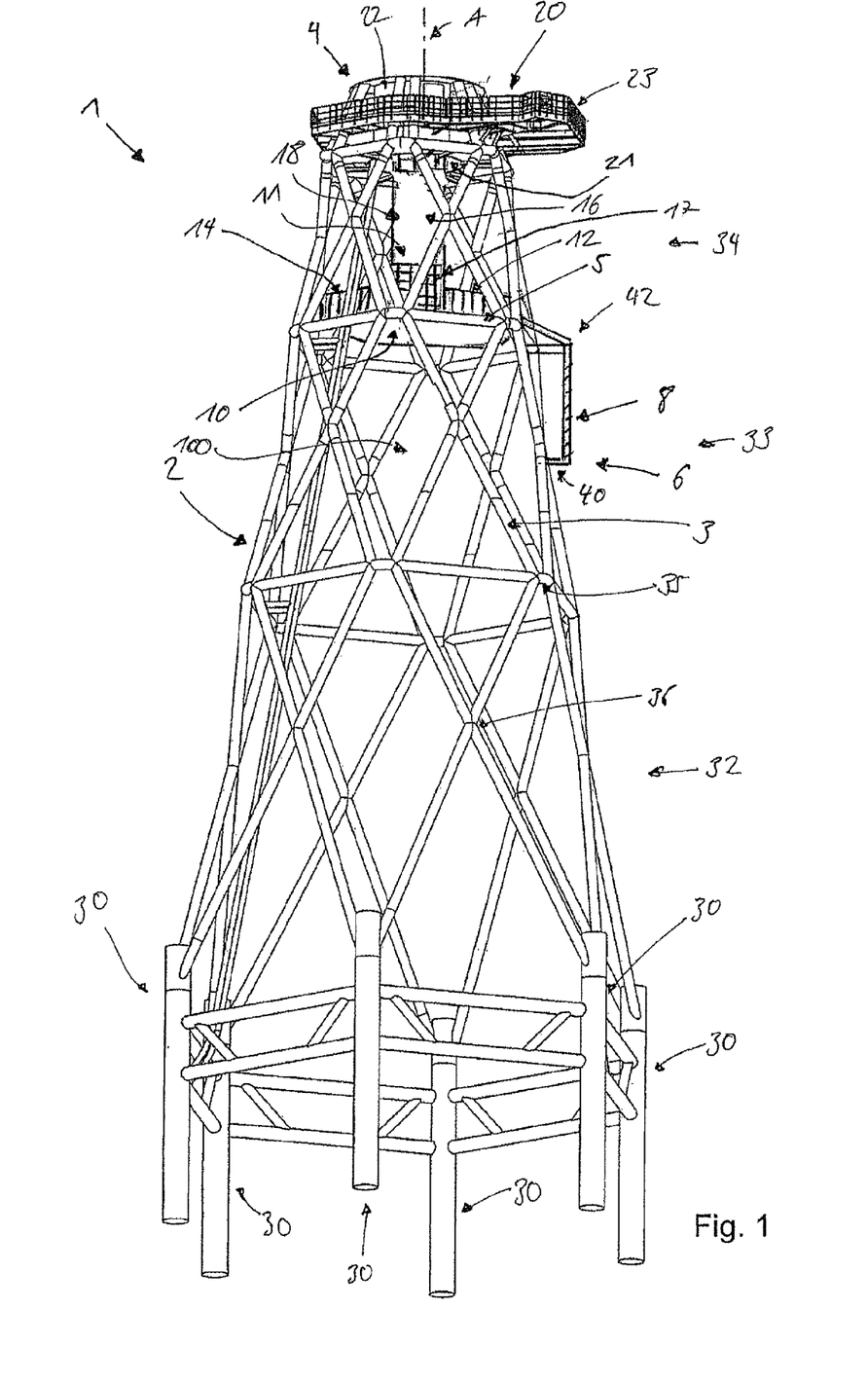
FIG. 1 shows a first embodiment of the offshore foundation structure according to the invention.

Referring to FIG. 1 the offshore foundation structure 1 according to the invention has a jacket portion 2 including a plurality of struts interconnected in a framework-like manner. Arranged within the jacket portion 2 of the offshore foundation structure 1 is a receiving means 4 for a tower shaft 22 of a wind power installation. The receiving means 4 has an opening (concealed) which extends along a substantially vertical longitudinal axis A and is of a cylindrical configuration. The opening in the receiving means 4 makes it possible for the tower shaft 22 to be arranged partially within the jacket portion 2.

A service platform 20 is arranged on the jacket portion 2. The service platform 20 has a circular opening 21 through which the tower shaft 2 extends. In addition fixed to the outside edges of service platform 20 is a railing 23 which extends completely around the service platform 20.

The offshore foundation structure 1 for wind power installations (WPI), as shown in FIG. 1, has six piles 30 which can be anchored in the sea bed. The jacket portion 2 is connected to the piles 30. The jacket portion 2 is of a substantially conical or frustoconical configuration and is of a substantially hexagonal cross-section with respect to a longitudinal axis A of the jacket portion 2. It is connected with its six lower corners to the six piles 30. The jacket portion 2 has three segments 32, 33, 34 which are arranged one above the other in substantially mutually coaxial relationship.

The jacket portion 2 including the segments 32, 33, 34 is formed from tubes or struts 3, 5 (only a respective one of which is provided with a reference numeral), which are connected together by means of nodes 35, 36 (only two respective ones of which are provided with reference numerals). The node 35 is in the form of a so-called rounded node; for details of that node attention is directed in particular to WO 2013/139816 A2 in which those nodes are described in detail and the disclosure of which is incorporated herein by means of reference thereto.

The docking arrangement 6 is provided in the central segment 33. The docking arrangement 6 is fixedly connected in a lower portion 40 to substantially vertically extending struts 3 so that a boat can land here. The lower portion 40 is preferably arranged in that region somewhat lower than the average sea level (see FIG. 2) so that it can always be reached with a boat. Extending above same is a ladder 8 which extends to an upper portion 42 of the docking arrangement 6. Here the docking arrangement is again fixedly connected to the jacket portion 2. Preferably provided in that upper region 42 is a housing, a railing or the like so that a service personnel employee can easily pass into the interior 100 of the jacket portion. The platform 10 is provided in the internal cross-section in the interior 100 of the jacket portion on the transition between the segment 33 and the segment 34. In this embodiment the platform is substantially in the form of a circular disc, for example of steel plate. In this embodiment the platform 10 is connected to two gangways 12, 14 which extend from the platform 10 to the peripheral surface of the jacket portion 2, wherein in this embodiment for example only the gangway 12 is provided with a docking arrangement 6. Likewise a docking arrangement is usually provided for the gangway 14, but this is not shown in this Figure for the sake of simplicity. It should be appreciated that it is also preferable to provide three or more gangways between the platform 10 and an outside region of the jacket portion. In that way it is possible to dock to the offshore foundation structure 1 with a boat from two sides (from right and left in relation to FIG. 1), depending on the weather. A service employee passes into the centre 11 of the platform 10 through both gangways 12, 14. In this embodiment the gangways 12, 14 are in the form of passages with railings and substantially comprise a floor plate which for example is made from steel plate and side railings which provide protection for the service employee and on which preferably securing elements are arranged so that a service employee can hook his safety belt to the railing. The service employee passes to the centre 11 of the platform by way of the gangways 12, 14. Provided in the centre of the platform is an ascension device 16 in the form of a lift 18 having a lift cage 17. The lift cage 17 is accessible from both gangways 12, 14. The lift 18 is arranged vertically beneath the tower portion 22 and can move along the longitudinal axis A coaxially into the tower portion 22.

Then for example provided in the interior of the tower portion 22 is a platform or a room or the like so that the service employee can change clothes and then can begin his work in the interior of the tower. This will be described in greater detail hereinafter with reference to FIGS. 3 to 6. Usually the service employee also passes from the interior of the tower into the pod in which the transmission and motors or the like of the wind power installation are arranged. In addition a door is preferably provided in the tower portion 22 so that the service employee can pass on to the service platform 20.

In that way work on the wind power installation is substantially simplified and the safety aspect is enhanced. There are preferably provided two or more docking arrangements 6 which are respectively connected to a gangway 12, 14. A boat can dock without any problem at those docking arrangements 6 without the risk of damaging delicate parts of the wind power installation or the foundation structure. The service employee only has to climb up a short ladder 8 to reach the platform 10. The platform is arranged a good distance below the tower portion 22, preferably about 5 to 15 m. There the service employee can take a short rest and can then climb into the lift cage 17 of the lift by way of the gangway and go directly into the interior of the tower 22. The lift 18 is protected by the platform 10 and the covering portion surrounding it. This also substantially reduces the risk of the lift 18 being damaged. In addition only one lift 18 is necessary although it is possible for a boat to dock at the offshore foundation structure 1 from a number of sides. Manufacture and assembly of the offshore foundation structure 1 are also substantially simplified and made inexpensively possible by virtue thereof.

FIGS. 2 to 6 describe a further embodiment which is substantially identical to the first embodiment. In this respect the same and similar components are denoted by the same references as in the first embodiment and reference is directed in its entirety to the foregoing description. Hereinafter it is essentially the differences in relation to the first embodiment that will be discussed.

Figure 2:
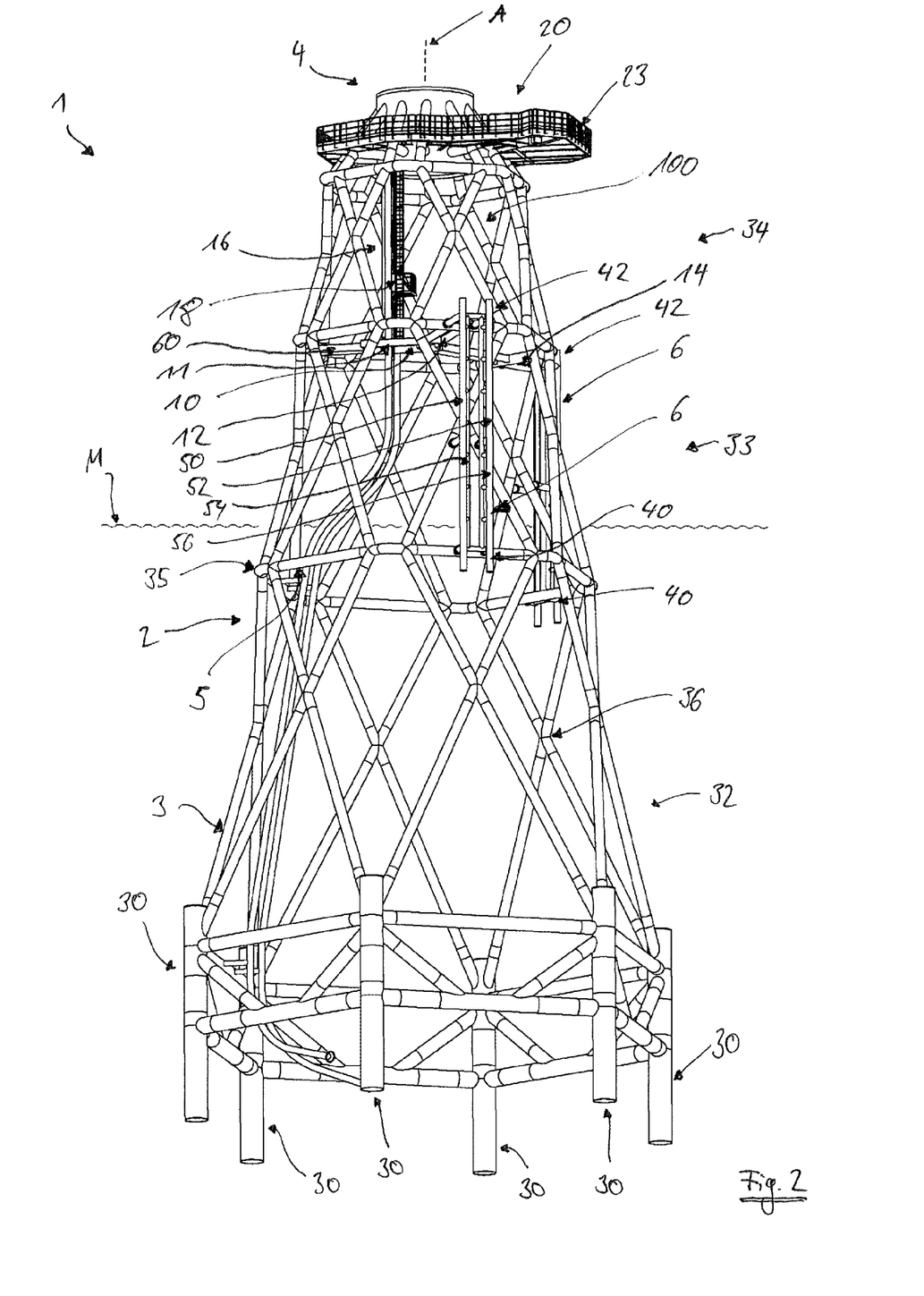
FIG. 2 shows a second embodiment of the offshore foundation structure according to the invention.

Referring to FIG. 2 an offshore foundation structure 1 having a jacket portion 2 is again shown. Provided in the transitional region between the segments 33 and 34 is a platform 10 connected to the jacket portion 2 by way of two gangways 12, 14. At the radially outer end of the gangways 12, 14 they are connected to a docking arrangement 6. The docking arrangement 6 extends from the intermediate ring between the segments 33 and 34 to the intermediate ring between the segments 32 and 33. The sea level M is shown in FIG. 2, usually being in the region of the central segment 33 so that it is always possible to reach the docking arrangements 6 with a boat. As in the first embodiment the docking arrangements 6 are coupled at the lower portion 40 to the jacket portion 2 and also coupled with an upper portion 42 to the jacket portion 2. The docking arrangements 6 have two struts 50, 52 which extend in substantially mutually parallel relationship and to which a boat can be secured. Those struts 50, 52 are directed outwardly radially with respect to the axis A. Provided radially inwardly are two further struts 54, 56 between which a ladder or the like can be provided so that a service employee, even if a boat docks rather in the lower region 40 of the docking arrangement 6, can climb up to the upper portion 42.

Figure 3:
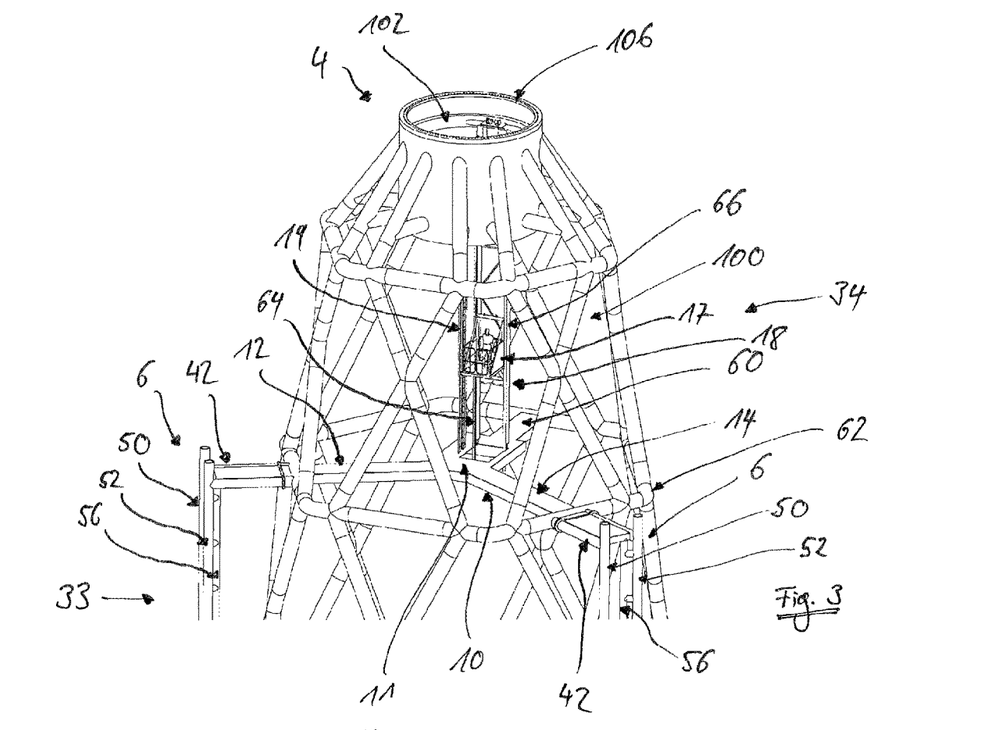
FIG. 3 shows a detail view from FIG. 2.
Figure 4:
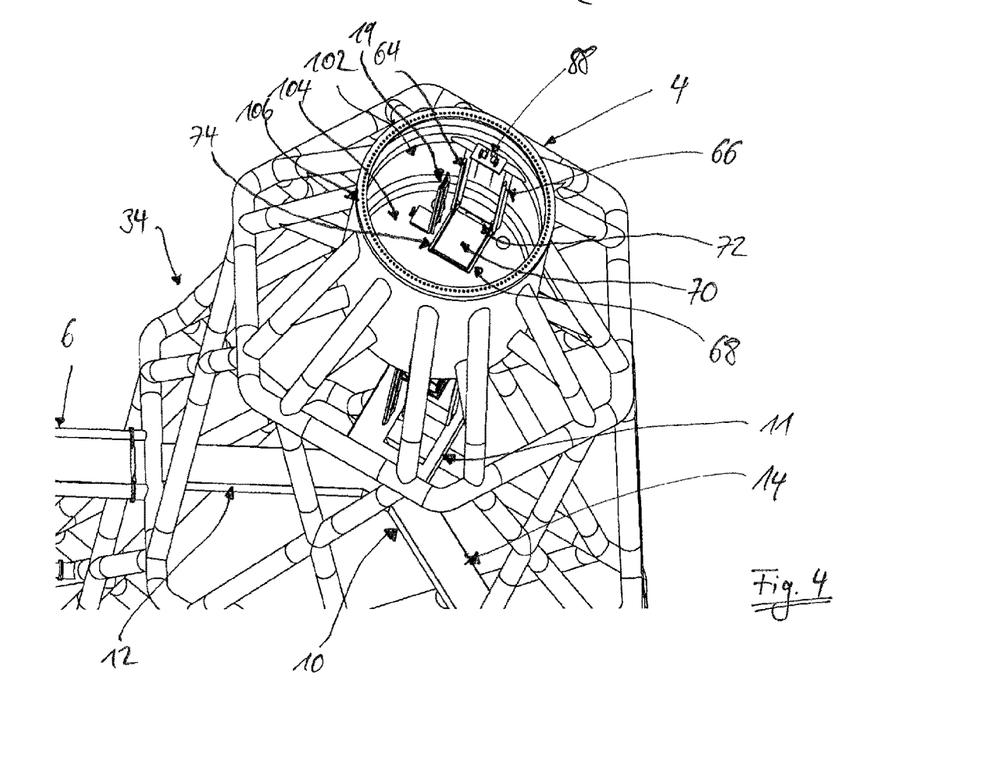
FIG. 4 shows a further detail view from FIG. 2 as a perspective.
Figure 5:
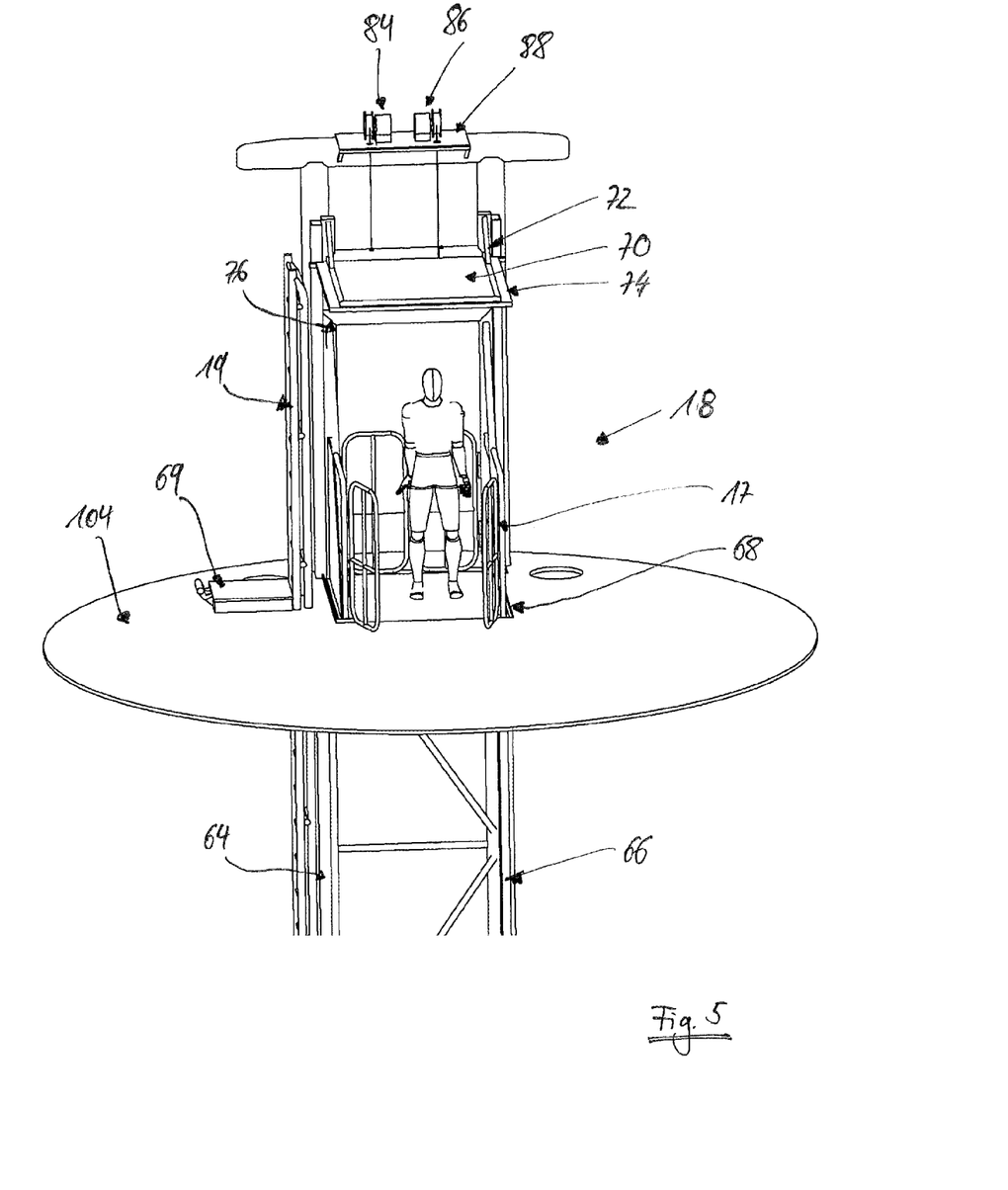
FIG. 5 shows a partly sectioned detail view of a bottom of the tower receiving means.
Figure 6:
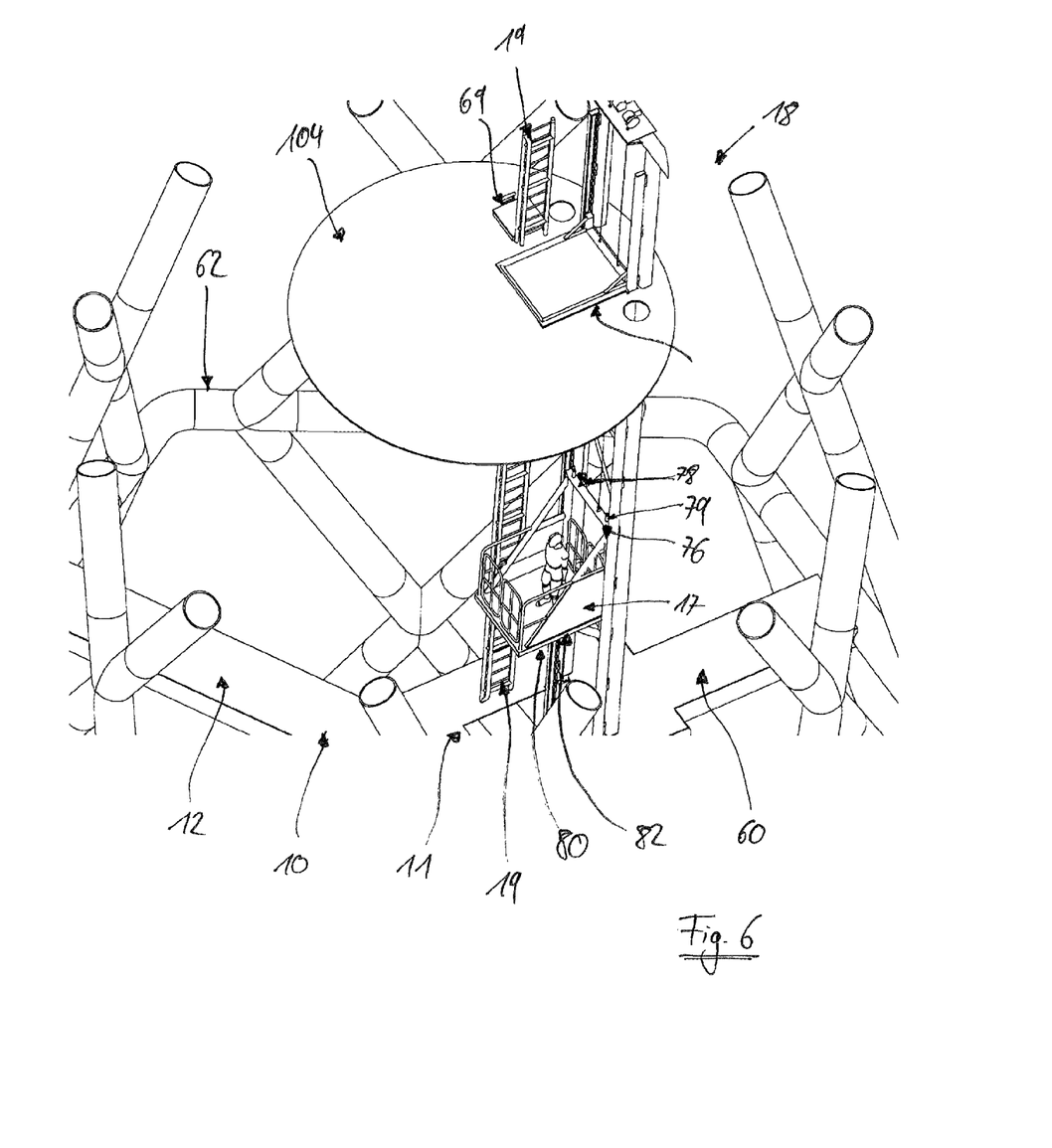
FIG. 6 shows a partial section through the tower receiving means.

In this embodiment the platform 10 again has a central region 11 and is further provided with a support strut 60 which extends to the jacket portion 2 at the side of the platform 10, that faces away from the gangways 12, 14, and it thus increases the stability of the platform (see in particular FIG. 3). As can be seen from FIG. 3 the two gangways 12, 14 and the struts 60 extend in mutually displaced relationship approximately through 120° angles from the central region 11 and are respectively connected to a ring element 62 of the jacket portion 2 which forms the transition between the segments 34 and 33. This therefore enhances stability, but also retains a certain flexibility in the jacket portion 2.

The ascension means 16 in this embodiment has both a lift 18 and also a ladder 19. Both extend approximately parallel to each other. The ladder 19 serves primarily as a safety solution, that is to say it affords redundant ascension into the interior 102 of the receiving means 4 or the transition piece 4.

In this embodiment the lift 18 has a lift cage 17 which travels on two rails 64, 66. The rails 64, 66 extend from the central region 11 of the platform 10 into the interior 102 of the transition piece 4 (see FIG. 4). The transition piece 4 has a floor 104. At the upper edge the transition piece 4 has a flange portion 106 to which a tower of a wind power installation can be flange-mounted.

Provided in the floor 104 is a hatch 68 through which the lift cage 17 can pass. The hatch 68 is closed by a cover 70. The cover 70 is coupled to the rails 64, 66 of the lift 16 by way of its own lift car 72. The cover 70, by virtue of rubber seals 74 at its edge, effectively prevents the ingress of spray and salt water-saturated ambient air from the region beneath the transition piece 4 in order to protect the electrical or other installations in its interior from corrosion or short-circuits. The weight of the cover 70 is preferably such that even a gust of wind in bad weather cannot lift it. Besides the cover 70 which closes the hatch 68 there is a further hatch 69 together with a hatch cover, which is associated with the ladder 19 (see FIG. 5).

When the service employee uses the lift 18 the cover 70 in this embodiment is lifted as follows. At the moment at which the upper part 76 of the lift cage 17 reaches the cover 70 it is contacted by two rubber buffers 78, 79 (see FIG. 6) which are fixed to the lift cage 17, and lifted by the lift cage 17, and opens the opening 68 in the floor 104 of the transition piece 4. The lift cage 17 is in turn provided at its underside 80 (see FIG. 6) with sealing rubber strips 82 and thus provides for sufficient protection from the ingress of air from the region beneath the transition piece 4 when the lift cage 17 is in the position shown in FIG. 5. The cover 70 moves upwardly together with the lift cage 17 and comes to halt there at the upper end of the rails 64, 66.

In the downward movement of the lift cage 17 the cover 70 is firstly moved downwardly again until it is stopped by bearing against the edges of the opening 68 in the floor and again forms a seal.

The lift 18 has two synchronised cable winches 84, 86, preferably being electronically synchronised, which are mounted on a winch platform 88 (see FIGS. 4 and 5) above the upper end of the rails 64, 66. In normal operation they jointly move the lift cage 17 up and down, but in the event of failure of one of the winches they can do that individually. They are therefore of a redundant design. An emergency braking system on the lift cage 17 prevents the cage 17 from crashing in the event of both cables breaking. If the lift cage 17 should come to a stop upon a fault in operation in the centre of the lift guide, that is to say between the platform and the floor 104, for example in a position as shown in FIG. 3, it is possible to leave the lift cage 17 by way of the ladder 19 mounted directly in its proximity. The winches 84, 86 are intended to permit the lift cage 17 to be let down slowly in an emergency situation by the use of a manually releasable centrifugal brake.

The invention claimed is:

1. An offshore foundation structure, comprising:
   a jacket portion comprising a plurality of struts interconnected in a framework,
   a receiver for a tower shaft of a wind power installation, and
   a platform extending across an entire internal cross-section of the jacket portion above at least one of the plurality of struts, the platform comprising a central portion, an ascension region for receiving an ascension device, and at least one gangway extending radially from the central portion, the at least one gangway being at least partially within the internal cross-section of the jacket portion,
   wherein the at least one gangway is directly connected to at least one of the plurality of struts to connect the at least one of the plurality of struts to the central portion, and
   wherein the at least one gangway is directly connected to a climbing device to connect the climbing device to the ascension region.

2. The offshore foundation structure of claim 1, further comprising one or more of:
   a docking arrangement, and
   a landing structure and/or a boat landing for docking of a boat.

3. The offshore foundation structure of claim 2, wherein the platform is reached from the docking arrangement via the climbing device.

4. The offshore foundation structure of claim 3, wherein the climbing device connects the docking arrangement to the platform.

5. The offshore foundation structure of claim 1, wherein the platform is of a triangular, quadrangular, hexagonal or round basic shape or is part of the basic shape.

6. The offshore foundation structure of claim 1, wherein the jacket portion has regions having substantially horizontally extending struts and the platform is arranged in said regions.

7. The offshore foundation structure of claim 6, wherein the platform is connected to at least one horizontally extending strut via a welded or clamping connection.

8. The offshore foundation structure of claim 1, wherein the platform has a railing.

9. The offshore foundation structure of claim 1, wherein the platform has a roof.

10. The offshore foundation structure of claim 1, wherein the jacket portion has at least one wave-breaking element in the region of the platform.

11. The offshore foundation structure of claim 1, wherein, in the region of the platform, the jacket portion has at least one grid extending between the plurality of struts of the framework.

12. The offshore foundation structure of claim 1, further comprising a plurality of piles configured to be anchored underwater in the seabed, wherein the jacket portion is connected to the plurality of piles above the water.

13. An offshore foundation structure, comprising:
   a jacket portion comprising a plurality of struts interconnected in a framework having an interior,
   a receiver for a tower shaft of a wind power installation, and
   a platform arranged in a center of the interior of the jacket portion above at least one of the plurality of struts, the platform comprising a central portion, an ascension region for receiving an ascension device, and at least one gangway extending radially from the central portion, the at least one gangway being at least partially within the interior of the jacket portion,
   wherein the at least one gangway is directly connected to at least one of the plurality of struts to connect the at least one of the plurality of struts to the central portion, and
   wherein the at least one gangway is directly connected to a climbing device to connect the climbing device to the ascension region.

14. The offshore foundation structure of claim 13, wherein the at least one gangway has two railings which laterally delimit the path of movement.

15. The offshore foundation structure of claim 13, wherein the at least one gangway is roofed.

16. The offshore foundation structure of claim 13, wherein the at least one gangway is enclosed with a grid structure.

17. The offshore foundation structure of claim 13, wherein the at least one gangway extends substantially perpendicularly with respect to a longitudinal axis of a foundation structure and intersects said longitudinal axis.

18. The offshore foundation structure of claim 13, further comprising a plurality of piles configured to be anchored underwater in the seabed, wherein the jacket portion is connected to the plurality of piles above the water.

19. An offshore foundation structure, comprising:
   a jacket portion comprising a plurality of struts which are interconnected in a framework having an interior,
   a receiver for a tower shaft of a wind power installation, and
   a platform arranged in a center of the interior of the jacket portion above at least one of the plurality of struts, the platform comprising a central portion, an ascension device for climbing into an interior of the tower shaft, and at least one gangway extending radially from the central portion, the at least one gangway being at least partially within the interior of the jacket portion, wherein the at least one gangway is directly connected to at least one of the plurality of struts to connect the at least one of the plurality of struts to the central portion, and wherein the at least one gangway is directly connected to a climbing device to connect the climbing device to the ascension device.

20. The offshore foundation structure of claim 19, wherein the ascension device is a ladder leading from the platform into the interior of the tower shaft.

21. The offshore foundation structure of claim 19, wherein the ascension device is a lift.

22. The offshore foundation structure of claim 19, wherein the ascension device extends substantially along a central axis of the jacket portion.

23. The offshore foundation structure of claim 19, wherein the ascension device is accessible from two or more sides.

24. The offshore foundation structure of claim 19, further comprising two or more docking arrangements and corresponding two or more gangways which all lead to the ascension device.

25. The offshore foundation structure of claim 19, wherein the platform is arranged about 10 to 15 meters below the tower shaft.

26. The offshore foundation structure of claim 19, wherein the ascension device is of a length of not more than 8 meters.

27. The offshore foundation structure of claim 19, further comprising a plurality of piles configured to be anchored underwater in the seabed, wherein the jacket portion is connected to the plurality of piles above the water.

28. An offshore foundation structure, comprising:
a jacket portion comprising a plurality of struts interconnected in a framework,
a receiver for a tower shaft of a wind power installation, and
a platform extending only across an entire internal cross-section of the jacket portion above at least one of the plurality of struts, wherein a part of the jacket portion is above the platform, the platform comprising a central portion, an ascension region for receiving an ascension device, and at least one gangway extending radially from the central portion, the at least one gangway being at least partially within the internal cross-section of the jacket portion, wherein the at least one gangway is directly connected to at least one of the plurality of struts to connect the at least one of the plurality of struts to the central portion, and wherein the at least one gangway is directly connected to a climbing device to connect the climbing device to the ascension region.

29. An offshore foundation structure, comprising:
a jacket portion comprising a plurality of struts interconnected in a framework having an interior,
a receiver for a tower shaft of a wind power installation, and
a platform arranged in a center of the interior of the jacket portion above at least one of the plurality of struts, wherein a part of the jacket portion is above the platform and wherein the platform does not protrude to an exterior of the jacket portion, the platform comprising a central portion, an ascension region for receiving an ascension device, and at least one gangway extending radially from the central portion, the at least one gangway being at least partially within the interior of the jacket portion, wherein the at least one gangway is directly connected to at least one of the plurality of struts to connect the at least one of the plurality of struts to the central portion, and wherein the at least one gangway is directly connected to a climbing device to connect the climbing device to the ascension region.

30. An offshore foundation structure, comprising:
a jacket portion comprising a plurality of struts which are interconnected in a framework having an interior,
a receiver for a tower shaft of a wind power installation, and
a platform arranged in a center of the interior of the jacket portion above at least one of the plurality of struts, wherein a part of the jacket portion is above the platform and wherein the platform does not protrude to an exterior of the jacket portion, the platform comprising a central portion, an ascension device for climbing into an interior of the tower shaft, and at least one gangway extending radially from the central portion, the at least one gangway being at least partially within the interior of the jacket portion, wherein the at least one gangway is directly connected to at least one of the plurality of struts to connect the at least one of the plurality of struts to the central portion, and wherein the at least one gangway is directly connected to a climbing device to connect the climbing device to the ascension device.

* * * * *